Dec. 31, 1929.  W. W. SLOANE  1,742,012
CABLE REEL LOCOMOTIVE
Filed June 22, 1927  2 Sheets-Sheet 1
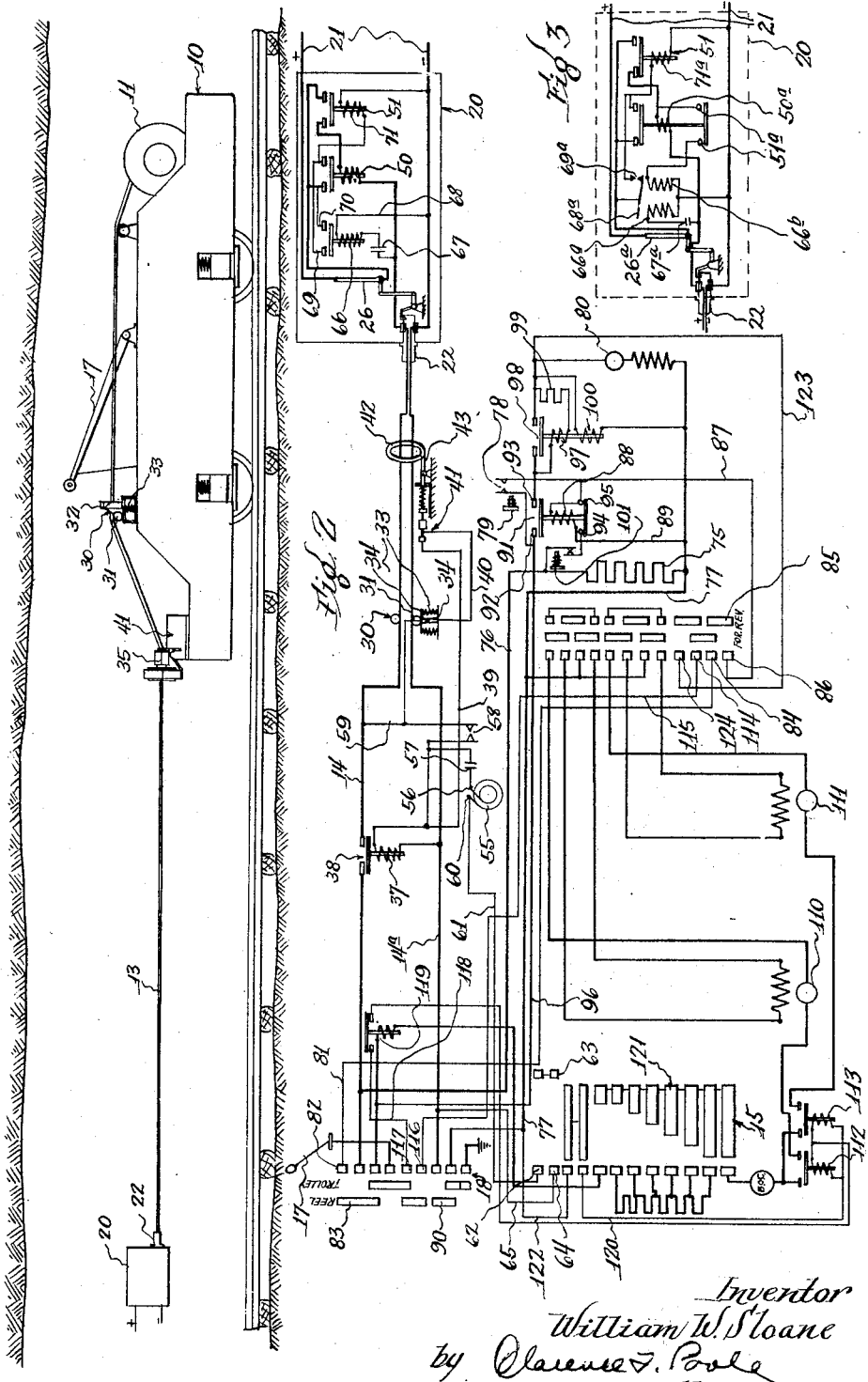
Inventor
William W. Sloane
by Clarence F. Poole
Attorney

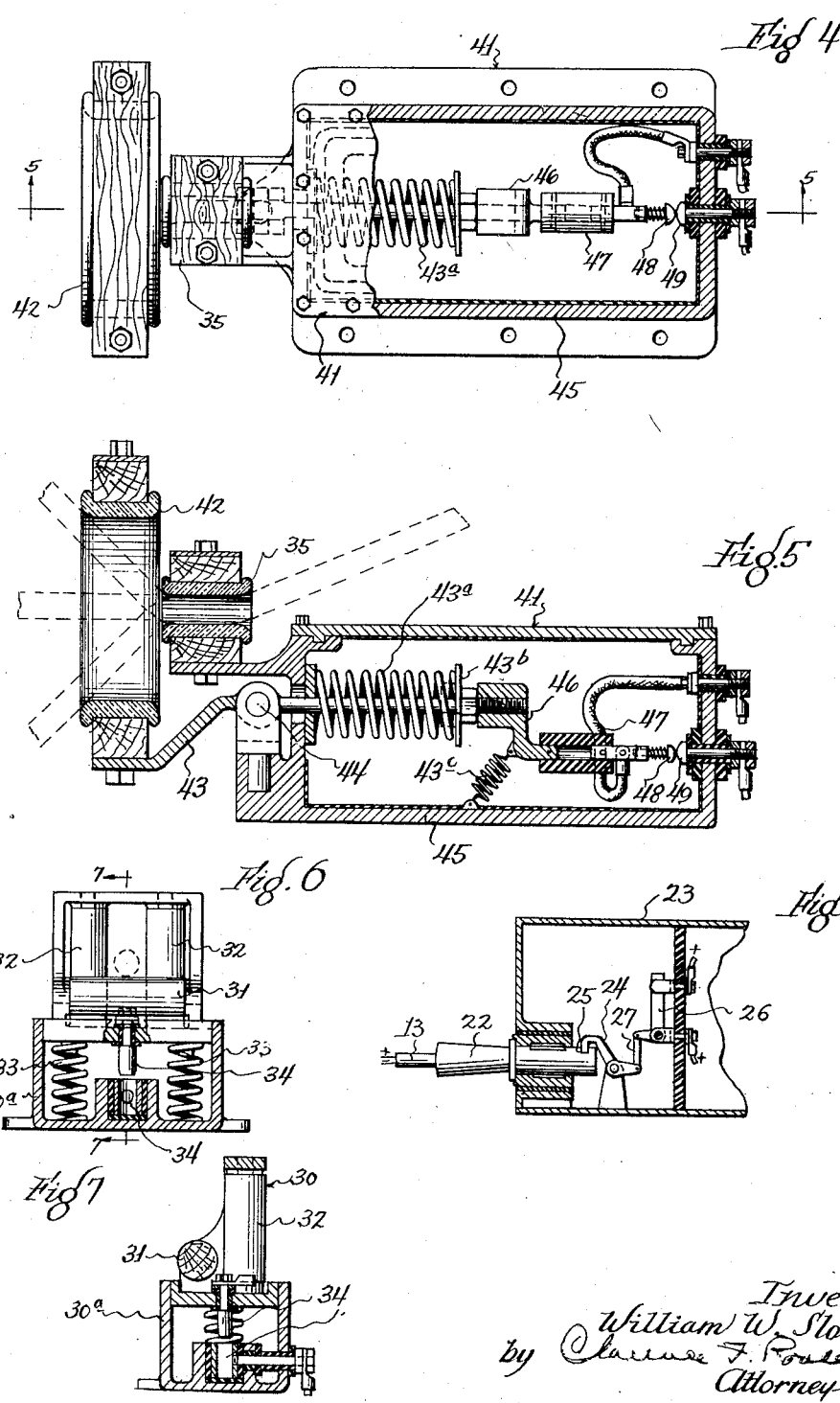

Patented Dec. 31, 1929

1,742,012

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CABLE-REEL LOCOMOTIVE

Application filed June 22, 1927. Serial No. 200,668.

This invention relates to improvements in cable reel locomotives of the type utilized in gaseous mines and has for its principal object to reduce the hazards accompanying the use of a flexible cable for conducting power to the locomotive, owing to the possibility of accidentally running over the cable while it is in use, and thereby causing an arc sufficient to cause explosions.

The invention consists broadly in providing certain safeguard against conditions which are most likely to arise when the locomotive is likely to run over or fouls its cable, either accidentally or otherwise.

As heretofore constructed, cable reel locomotives have been provided with automatic means for paying out the cable from the reel while the locomotive is moving away from the point of connection of the cable with the main power line, and means have also been provided for positively winding up the cable on its reel while the locomotive is moving in the opposite direction. To these ends, the cable reel is normally provided with suitable braking devices so that the cable will be unwound therefrom under sufficient tension to keep the cable fairly taut along the mine track, and so as to be readily reeled in as the locomotive returns. A separate cable reel motor is usually provided, with either automatic or manually operated control means, to wind in the cable on its reel whenever the locomotive is moving in the reverse direction toward its cable.

In the following description, the term "forward" as applied to movement of the locomotive, will be understod to mean movement away from the source of power, and when the cable is being unwound from its reel, while "reverse" movement of the locomotive will be understood to apply to movement toward its source of power connections, and in a direction to wind in the cable.

Among the hazardous conditions sought to be safeguarded by the present invention are those in which the cable is not kept in taut condition when the locomotive is moving in reverse direction so as to lie on the track and thus become fouled on the track ties, or other obstruction; or in case the locomotive slides back by gravity when upon a grade so as to run over the cable; or in case the reel motor fails to start for one reason or another when the locomotive is reversed. Certain other hazardous conditions which might arise owing to the temporary failure of power in the supply lines are also provided for, as will more fully appear in the following description.

The invention may be best understood by reference to the accompanying drawings in which:

Figure 1 is a diagrammatic view including a locomotive showing parts of the safety devices mounted thereon and with the ends of the cable connected to a junction box such as may be disposed at the end of the power line or adjacent the main entry of the mine;

Figure 2 is a wiring diagram of the parts of the system carried on the locomotive and in the junction box;

Figure 3 is a diagram of a modified form of junction box;

Figure 4 is an enlarged detail plan view of the deflection switch forming part of my invention, with parts broken away;

Figure 5 is a section taken on line 5—5 of Figure 4;

Figure 6 is an enlarged detail view of the tension switch, viewed from the rear end of the locomotive;

Figure 7 is a section taken on line 7—7 of Figure 6;

Figure 8 is an enlarged detail view of the locking mechanism on the junction box.

Referring now to the details shown in the drawings:

A locomotive 10 is provided with a cable reel 11 having collector rings of the usual form (not shown) thereon, and cable 13 consisting of two conductor wires 14, 14ª, insulated therein in the usual manner. The locomotive is also provided with a controller, including a resistance control drum 15 and a reverse drum 16. Such locomotives are usually provided with a trolley for use in sections of the mine having trolley wire and having sufficient ventilation to safeguard against gaseous conditions. In the form shown, a trolley 17 is provided and in connection there-with a trolley and reel transfer switch indicated generally at 18 by means of which the main power connections may be set at will to operate on the trolley or reel.

All of the electrical parts of the locomotive are preferably of the enclosed flame-proof type, in order to permit the locomotive to operate with safety in gaseous portions of the mine.

Among the features of the present invention is the provision of a junction box 20 having the main current supply lines 21, 21, connected thereto and to which the terminal plug 22 of cable 13 is connected. It will be understood that a plurality of these junction boxes are provided in the mine at suitable places which can be reached by the locomotive cable, as for instance on the main entries. Such main entries are usually relatively well ventilated so that rigid flame-proof construction is not always as necessary as with the locomotive itself. In the form shown however, the junction box is also of the flame-proof type, including a casing indicated at 23 enclosing certain contactors or relays whereby the main operating currents may be established or cut off under certain operating conditions of the locomotive, as will hereinafter appear in connection with the description of these controlling means carried on the locomotive.

In carrying out the flame-proof feature of the junction box I provide the terminal plug 22 with safety locking means of a well known type whereby the plug cannot be inserted or withdrawn while there is potential on the terminals of the junction box. As shown in detail in Figure 8, this locking means comprises a lever 24, which is movable into locking engagement with a notch 25 on the side of the plug 22. The lever 24 is connected to a main line switch 26 by link 27. The arrangement is such that the plug 22 cannot be inserted or withdrawn unless the switch 26 is open, and when said plug is in locking position, with the switch closed, as shown, said plug cannot be withdrawn.

In order to produce and maintain the desired tension on the cable, the cable reel 11 is provided with the usual suitable friction means, or its equivalent, so that as the cable is unwound from the reel it is maintained under a definite tension. Several devices of this character are well known in the art, being usually employed in gathering reel locomotives, so that they need not be described herein in detail. However, in order to provide means whereby the main operating circuits through the cable may be automatically disconnected in case the normal tension on the cable is not maintained, as for instance, when the reel motor fails to operate when the locomotive is traveling in reverse, I provide an automatic tension switch 30 suitably mounted on the locomotive so as to be responsive to tension on the cable at all times. This switch consists of a guide member preferably provided with a horizontally disposed roller 31, and vertically disposed rollers 32, 32, and the entire guide member is mounted on tension springs 33, 33, which are normally depressed by tension on the cable so as to maintain contacts 34, 34 in engagement with each other. Said contacts are enclosed in a flame-proof casing 30ª. The guide roller 31 of the tension switch 30 is suitably disposed on the locomotive at a point of deflection on the cable so as to be responsive to differences in tension on the latter. In the form shown the cable reel 11 is mounted at the forward end of the locomotive and the cable 13 is passed rearwardly over the deck of the locomotive to the tension switch 30 and thence downwardly to a fixed guide member 35 at the rear end of the locomotive. It will be understood however, that the reel could, if desired, be disposed at other places on the locomotive and in closer proximity to the cooperating tension switch 30 and the fixed guide member 35, providing the tension switch 30 is in offset relationship between the fixed guide member 35 and the normal line of extension of the cable 13 toward the reel.

The tension switch 30 normally is closed when the cable is maintained under its desired tension and forms a part of an auxiliary relay circuit for automatically cutting off the power in the cable 13 as soon as tension thereon falls below a predetermined value sufficient to separate the contacts 34, 34. This auxiliary circuit includes conductor 36, fixed contact 34 and coil 37 of the main line contactor 38 in the positive cable wire 14. From relay coil 37, the auxiliary circuit is connected to the minus power line 14ª through conductors 39 and 40 which in the present invention also pass through a second control switch 41 responsive to angular deflections of the cable from its normal extended position, which switch will now be described in detail.

The angular deflection switch 41 comprises a ring 42 carried on the arm 43 adjacent the fixed guide 35 through which the cable is trained. The arm 43 has a universal joint support at 44, and extends into a flame-proof casing 45. An extension 46 has an insulating piece 47 carrying a spring pressed contact 48 thereon, which is adapted, when held in one position, to register with a contact 49 mounted on the side of casing 45. Suitable tension means are provided for normally maintaining the contacts 48 and 49 in contact, herein consisting of a coil spring 43ª interposed between the outer wall of the casing and a stop 43ᵇ on the inner end of arm 43 so as to tend to maintain the latter in centralized position, as shown. An auxiliary spring 43ᶜ may also be provided to counterbalance the weight of the ring 42.

It will be observed that breaking of contacts 48, 49, of the deflection switch 41 immediately operated to break the circuit through the positive line 14 so as to eliminate all danger of arcing in case the cable 13 should be run over. Therefore, in order to maintain the main operating circuit through the cable 13 it is necessary not only to maintain a predetermined amount of tension on the cable but also to maintain the cable in its desired extended position from the fixed guide 35, without contacting with the ring 42 of the deflection switch 41. Any desired angular clearance may be provided for the cable within the ring 42, herein a deflection of about 45° being permissible before the cable will engage the ring to break the deflection switch circuit. This permits a relatively wide range of movement of the cable with respect to the locomotive, as for instance when the locomotive passes around track curves, but it is fully sufficient to break the current whenever the cable is in immediate danger of being run over, as for instance when it becomes fouled on the mine tracks or other obstructions.

Means are also provided in the junction box for automatically cutting off all potential from the cable 13 as soon as the relay 38 is opened. This means comprises a series relay 50 and a contractor 51 disposed in the junction box 20. The series relay and contactor are normally closed when the locomotive is operating with power on the cable 13 but as soon as contactor 38 on the locomotive is opened as by breaking the contacts either in the tension switch 30 or deflection switch 41, as described, the series relay 50 will open, thereby opening the contactor 51 and cutting off all potential on the cable. The operations of this apparatus will all function within the fraction of a second so that before the locomotive can reach the cable and run over it, the cable will have been entirely disconnected from the power supply.

Means for re-establishing the main power lines through series relay 50 and contactor 51 consists of a magneto 55 disposed on the locomotive in position to be operated by the motorman. This magneto is of the ordinary alternating current type and is connected across the main lines 14 and 14ª on the locomotive. In the form shown this connection is made from one terminal 56 of the magneto through the condenser 57, conductor 36, contacts 34, 34, of switch 30, conductor 59 to the positive line 14.

The contacts 58 may also be included in the magneto circuit if desired, which contacts are of the usual type associated with magneto armatures, and are automatically closed when the magneto handle is turned but will automatically open when the turning movement of the handle is discontinued. With such an arrangement, it is not necessary that contacts 34, 34 of tension switch be closed in order to re-establish operating condition of the main line circuits. This is especially desirable in case the cable becomes slack for any reason, and it is necessary to furnish power to the locomotive for winding up the cable before resuming normal operations.

The other terminal 60 of the magneto is connected through conductor 61 to a contact 62 on the main resistance drum of the controller, and from thence may be connected by segment 63 to contact 64 and conductor 65 to minus line 14ª. This connection through the resistance drum of the controller is provided so that the magneto circuit can be completed and operative conditions restored only when the resistance drum is in the "off" position and fingers 62, 64 are connected by segment 63. This arrangement makes it necessary for the motorman to cut off the main operating current in his resistance drum, thereby making it impossible to restore current to the locomotive when the controller is accidentally left in a running position. The magneto circuit is completed through a suitable A. C. relay disposed in the junction box and operable, when closed, to re-establish the main line circuit through contactor 51. In the form shown in Figure 2 the A. C. relay is indicated at 66 which is connected to the positive line through condenser 67 and the negative line through conductor 68. Closing of the A. C. relay 66 in this arrangement establishes a current through contacts 69 and 70 which are connected across the main line through coil 71 of contactor 51 so as to close the latter contactor and establish potential through series relay 50, which in turn will serve to energize the cable conductors 14 and 14ª and re-establish the connection in the locomotive relay 38.

It will be observed, in the circuit arrangement shown in Figure 2, that re-establishment of the main line circuit tends to short circuit the magneto current, but the operation of A. C. relay 66 shown in Figure 2 may be retarded sufficiently by introducing a time lag to permit the contactors 51 and 38, and relay 50 to be fully closed before said A. C. relay drops open.

In the modified form of circuit arrangement shown in Figure 3 a somewhat similar circuit arrangement is shown for re-establishing the main line circuits through an auxiliary magneto circuit. In this form the A. C. relay 66ª and condenser 67ª are connected across the main power lines 21, 21, as before, but when energized, operates a pivoted armature 68ª so as to close a switch 69ª carried at the opposite end of said pivoted armature. Closing of this switch establishes a circuit through the coil 71ª of contactor 51. This establishes potential through relay contactor 38 on the locomotive to close the same and permit a flow of current through series relay 50ª to close the latter. Simultaneously a circuit is established through auxiliary contacts 51ª, 51ª, of said relay and a direct current coil 66ᵇ associated with the armature 68ª. Since the A. C. circuit through the coil 66ª is practically short circuited as soon as the main line circuit is established, the current through direct current coil 66ᵇ is sufficient to return the pivoted armature 68ª to its initial position shown in Figure 3. Establishment of potential upon the main lines being thus accomplished, the parts will be maintained in this position until the main circuits are again broken.

In order to produce and maintain sufficient current in the main cable circuit to retain series relay 50 and contactor 51 both in closed position when none of the devices on the locomotive are in operation, as for instance when the locomotive is temporarily standing idle, I provide a resistance unit 75 suitably connected across the main line conductors 76 and 77 which permits a continuous, relatively small, flow of current for this purpose.

After the cable has been disconnected from the power supply because of being subjected to any one of the above mentioned conditions tending to break the main power circuit, the motorman will ordinarily have sufficient time to stop the locomotive before the cable is run over. In order to reestablish operating connections however, he must first relieve the pressure of the cable from the ring 42 of the deflection switch 41, place the resistance drum of the controller in the "off" position, and crank the magneto 55. Applying pressure to the crank handle of the magneto closes switch 58 which is in parallel with the tension switch 30 and contacts 34, 34, and turning the magneto generates the alternating current which travels through the main cable lines 14 and 14ª to close the A. C. relay 66 (or 66ª, Figure 3). The closing of this relay causes the contactor 51 in the junction box to close, which in turn causes contactor 38 on the locomotive to close. Sufficient current will then flow through the locomotive resistance 75 to close the series relay 50. The magneto may then be stopped and the locomotive may be operated as before. It will be noted further, that in case the cable is slack, the switch 58 on magneto 55 must be held in closed position until sufficient tension is placed on tension switch 30 to close contacts 34, 34 by turning the magneto 55, since the contacts open the instant the motorman ceases to turn said magneto.

An automatic starting device is provided for the reel motor, as will now be described. This starting mechanism is so arranged that when the reel and trolley transfer switch 18 is in the reel position and the reverse drum 16 is in the reverse position the motor will automatically start, and continue to run as long as the reel and trolley transfer switch remains in the reel position. The connections for this purpose comprise an auxiliary conductor 81 having contact fingers 82 which engage the main contact 83 of the reel and trolley switch through which contactor power is supplied from the main positive line 14. The conductor 81 is connected to the finger 84 which when engaged with contact 85 on the reverse drum is connected to finger 86 thereof to conductor 87. From this conductor a circuit is established through relay 88 and conductor 89 to the main line circuit 77 which returns to negative line 14ª through segment 90 in the reel transfer switch.

Potential is then applied to contactor coil 88 which will cause contactor 91 to close thereby completing the circuit between contacts 92 and 93 and also completing the circuit between auxiliary contacts 94 and 95. Current may then flow from the positive line 14 to the reel transfer switch segment 83 through conductor 96, contact 92, relay 91, contact 93 to a series coil 97 of the series relay 98, through the motor starting resistance 99, the reel motor 80, to the negative return through conductor 77. Relay 98 may be of the well known current limiting acceleration type arranged so that it will close only when the current flowing through coil 97 has diminished to a certain predetermined value determined by the starting character of the motor 80. When the motor 80 has attained sufficient speed to diminish the current through relay coil 97 to the predetermined value, contactor 98 will close, allowing the current to flow from conductor 96 through contactors 91 and 98 to the motor 80 thus cutting all resistance out of the motor circuit. When relay 98 operates the series coil 97 and resistance 99 will have then been short circuited by the main line contacts of the relay. The relay will then be held in position by means of the shunt winding 100 which receives its excitations from the reel motor terminals.

After having started the reel motor by the method described the reel motor will continue to run after throwing the reverse drum to the forward position. Coil 88 of contactor 91 will receive its excitations from the reel transfer switch through conductor 76, through push button switch 101, auxiliary contacts 94 and 95 on contactr 91, and return by means of conductors 89 and 77. The reel motor can only be stopped in two ways, one is by throwing the reel transfer switch to the trolley position which will cut the potential off of contactor 91 and cause it to drop out. The second method of stopping the reel motor 80 while the reel transfer switch is in the reel position and the locomotive reverse drum is in the forward position is by causing the button 101 to be pushed, thus breaking the only source of potential to coil 88. If it should become necessary to operate the reel motor 80 while the reel transfer switch is in the trolley position, it may be started by pressing button 79 to cause potential to flow from conductor 98 through contacts 78, coil 88, which causes the contactor to close, the circuit return being through conductors 89 and 77. This causes the reel motor to start and operate only as long as there is pressure upon the push button 79. Upon releasing this button the contactor drops out, and the reel motor will stop.

The reel motor can also be started when the transfer switch is in the reel position and the reverse drum is in the forward position by pressing the button 79 and on releasing this button the motor will continue to run.

Propelling motors for the locomotive are indicated at 110 and 111 and are governed through contactors 112 and 113, respectively. As shown herein, these contactor operating coils are connected in parallel. When the controller resistance drum is moved to the first position, potential is established which closes these contactors, provided the reverse drum is in the forward position. The current then flows through conductor 81 to point 84 on the reverse drum, to point 114, through conductor 115, to point 116 on the transfer switch 18, thence from point 117 through conductor 118 through overload relay, which is normally closed, through conductor 119 to coils 112ª and 113ª respectively, of the contactors 112 and 113, thence through conductor 120, segments 121, 121, on controller drum 15, conductor 122, to the main negative feed line 77. However, should the reverse drum be in the reverse position, the control circuit for operating the contactors 112 and 113 can only be established through the reel motor circuit thereby affording an additional cable safety feature, since if for any reason the reel motor is not supplied with current and therefore fails to wind in the cable, the locomotive cannot approach the cable and run it over. This circuit is established through conductor 81 to point 84 on the reverse drum, thence through points 85 and 86 through conductor 87 to contactors 88 and 98 of the reel motor circuit, thence through conductor 123 to point 124 on the reverse drum, thence through point 114 and conductor 115 and thence through the circuit as above described for the contactors 112 and 113. Hence, if the contactors 91 and/or 98 fail to close when the reverse drum is in the reverse position the reel motor 80 will fail to operate and no current can flow to the motors 110 and 111.

Although I have shown and described one embodiment of my invention, it will be understood that the construction or arrangement of the various parts may be altered or changed without departing from the spirit and scope thereof. Furthermore, I do not wish to limit myself to the form illustrated, excepting as it may be limited in the appended claims.

I claim as my invention:

1. In combination with a cable reel locomotive, a cable having two conductors, a junction box having main operating lines and means for detachably connecting said cable thereto, and means on said locomotive responsive to tension on said cable for automatically cutting off potential from the latter.

2. In combination with a cable reel locomotive, a cable having two conductors, a junction box having main supply lines and means for detachably connecting said cable conductors thereto, guide means for paying out said cable from said locomotive at predetermined extended directions, and means responsive to variations from said predetermined direction for automatically cutting off power from said cable.

3. In combination with a cable reel locomotive, a cable having two conductors, a junction box having main supply lines and means for detachably connecting said cable thereto, means for winding in said cable under tension, and means responsive to tension on said cable for automatically cutting off potential from the latter.

4. In combination with a cable reel locomotive, a cable having two conductors, a junction box having main supply lines, means for detachably connecting said cable thereto, means responsive to tension on said cable for automatically cutting off potential from the latter, and means in said junction box responsive to means on said locomotive for restoring said potential in said cable.

5. In combination with a cable reel locomotive, a cable having two conductors, a junction box having main supply lines, means for detachably connecting said cable thereto, means responsive to tension on said cable for automatically cutting off potential from the latter, and means in said junction box responsive to electric excitation means on said locomotive and effective through said cable conductors for restoring said potential in said cable.

6. In combination with a cable reel locomotive, a junction box having main supply lines connected thereto, a cable having two conductors detachably connectible to said junction box for supplying direct current to said locomotive, means in said junction box responsive to means on said locomotive for automatically cutting off potential from said cable under predetermined operating conditions of said locomotive, and means in said junction box responsive to a manually controllable source of alternating current on said locomotive for automatically restoring direct current potential in said cable.

7. In combination with a locomotive having a cable reel and motor for operating the same, a controller on said locomotive including a reverse drum, a motor on said locomotive, and main power lines for operating said locomotive motor through said reverse drum only when said circuit includes said cable reel motor so that said locomotive motor cannot be operated in a direction toward the free end of said cable unless said cable reel motor is also in operation in a direction tending to wind in said cable.

8. In combination with a locomotive having a cable reel and a motor for operating the same, a controller on said locomotive including a reverse drum, power connections on said reverse drum supplying current to said cable reel motor for automatically starting the same whenever said reverse drum is placed in the reverse position to move said locomotive toward said cable, and means for maintaining said circuit in operating condition in either forward or reverse subsequent position of said reverse drum until said circuit is manually disconnected.

Signed at Chicago, in the county of Cook and State of Illinois, this 20th day of June, A. D. 1927.

WILLIAM W. SLOANE.